United States Patent
Agiwal et al.

(10) Patent No.: US 11,696,220 B2
(45) Date of Patent: *Jul. 4, 2023

(54) APPARATUS AND METHOD OF IDENTIFYING DOWNLINK TRANSMISSION BEAM IN A CELLULAR NETWORK

(71) Applicant: Samsung Electronics Co., Ltd., Suwon-si (KR)

(72) Inventors: Anil Agiwal, Suwon-si (KR); Himke Van Der Velde, Zwolle (NL)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/857,566

(22) Filed: Jul. 5, 2022

(65) Prior Publication Data

US 2022/0338102 A1 Oct. 20, 2022

Related U.S. Application Data

(63) Continuation of application No. 16/647,179, filed as application No. PCT/KR2018/010918 on Sep. 17, 2018, now Pat. No. 11,388,654.

(Continued)

(51) Int. Cl.
*H04W 48/14* (2009.01)
*H04W 16/28* (2009.01)
(Continued)

(52) U.S. Cl.
CPC .......... *H04W 48/14* (2013.01); *H04W 16/28* (2013.01); *H04W 56/001* (2013.01); *H04W 74/004* (2013.01)

(58) Field of Classification Search
CPC ... H04W 48/14; H04W 16/28; H04W 56/001; H04W 74/004; H04W 74/002; H04W 74/0866; H04W 74/0833; H04W 72/046
See application file for complete search history.

(56) References Cited

U.S. PATENT DOCUMENTS

2014/0162646 A1 6/2014 Lee et al.
2015/0312938 A1 10/2015 Larmo et al.
(Continued)

FOREIGN PATENT DOCUMENTS

CN 101217689 A 7/2008
CN 107113710 A 8/2017

OTHER PUBLICATIONS

Samsung, Beamformed Random Access: RA Resources for SI Request, 3GPP TSG-RAN WG2 #99, R2-1707681, Aug. 11, 2017, Berlin, Germany, See pp. 1-2.

(Continued)

*Primary Examiner* — Ricardo H Castaneyra
(74) *Attorney, Agent, or Firm* — Jefferson IP Law, LLP

(57) ABSTRACT

A communication method and system for converging a fifth generation (5G) communication system for supporting higher data rates beyond a fourth generation (4G) system with a technology for internet of things (IoT) are provided. The communication method and system includes intelligent services based on the 5G communication technology and the IoT-related technology, such as smart home, smart building, smart city, smart car, connected car, health care, digital education, smart retail, security and safety services. In accordance with an aspect of the disclosure, a method and an apparatus for transmitting a random access preamble in a wireless communication system are provided. In accordance with another aspect of the disclosure, a method and an apparatus for requesting and transmitting system information are provided.

16 Claims, 10 Drawing Sheets

Related U.S. Application Data

(60) Provisional application No. 62/559,158, filed on Sep. 15, 2017.

(51) Int. Cl.
  *H04W 56/00* (2009.01)
  *H04W 74/00* (2009.01)

(56) References Cited

U.S. PATENT DOCUMENTS

| | | |
|---|---|---|
| 2016/0119975 A1 | 4/2016 | Van Der Velde et al. |
| 2017/0231011 A1 | 8/2017 | Park et al. |
| 2017/0251500 A1 | 8/2017 | Agiwal et al. |
| 2019/0342825 A1 | 11/2019 | Liu |
| 2020/0008247 A1 | 1/2020 | Kwak et al. |
| 2020/0288451 A1 | 9/2020 | Lee et al. |
| 2020/0296765 A1 | 9/2020 | Kim et al. |

OTHER PUBLICATIONS

Interdigital Inc., PRACH Resource Configurations for Beamforming, 3GPP TSG-RAN WG2 #99, R2-1708725, Aug. 11, 2017, Berlin, Germany, See pp. 1-4.
Samsung, SI message TX/RX in NR, 3GPP TSG-RAN WG2 Meeting #97bis, R2-1702888, Mar. 24, 2017, Spokane, USA, See pp. 1-4.
Ericsson, "Remaining details on NR-RACH configurations and formats", 3GPP tsg_ran WG1, R1-1716154, Nagoya, Japan, Sep. 18-21, 2017.
LG Electronics, "On four-step RACH procedure", 3GPP tsg_ran WG1, R1-1713131, Prague, Czech Republic, Aug. 21-25, 2017.
Fujitsu, "Discussion on 4-step RA procedure", 3GPP tsg_ran WG1, R1-1710234, Qingdao, P R. China Jun. 27-30, 2017.
Chinese Office Action dated Feb. 27, 2023, issued in Chinese Application No. Application No. 201880059983.2.

APPARATUS AND METHOD OF IDENTIFYING DOWNLINK TRANSMISSION BEAM IN A CELLULAR NETWORK

CROSS-REFERENCE TO RELATED APPLICATION(S)

This application is a continuation application of prior application Ser. No. 16/647,179, filed on Mar. 13, 2020, which has issued as U.S. Pat. Ser. No. 11,388,654 on Jul. 12, 2022, which is a National Stage application under 35 U.S.C. § 371 of an International application number PCT/KR2018/010918, filed on Sep. 17, 2018, which is based on and claims priority under 35 U.S.C. § 119(e) of a U.S. Provisional patent application No. 62/559,158, filed on Sep. 15, 2017, in the U.S. Patent Office, the disclosure of which is incorporated by reference herein in its entirety.

TECHNICAL FIELD

The disclosure relates to a system, a method and an apparatus for receiving/transmitting data in a cellular network. More particularly, the disclosure relates to beam order during user equipment transmission beam sweeping and downlink transmission beam identification for Msg1 based system information request.

BACKGROUND ART

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'beyond 4G network' or a 'post long term evolution (LTE) System'. The 5G wireless communication system is considered to be implemented not only in lower frequency bands but also in higher frequency (mmWave) bands, e.g., 10 GHz to 100 GHz bands, so as to accomplish higher data rates. These frequency bands can be licensed or unlicensed. To mitigate propagation loss of the radio waves and increase the transmission distance, the beamforming, massive multiple-input multiple-output (MIMO), full dimensional MIMO (FD-MIMO), array antenna, an analog beam forming, and large scale antenna techniques are being considered in the design of the 5G wireless communication system. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

In the recent years several broadband wireless technologies have been developed to meet the growing number of broadband subscribers and to provide more and better applications and services. The second generation (2G) wireless communication system has been developed to provide voice services while ensuring the mobility of users. The third generation (3G) wireless communication system supports not only the voice service but also data service. The 4G wireless communication system has been developed to provide high-speed data service. However, the 4G wireless communication system suffers from lack of resources to meet the growing demand for high speed data services. Therefore, the 5G wireless communication system is being developed to meet the growing demand of various services with diverse requirement, e.g., high speed data services, support ultra-reliability and low latency applications.

In addition, the 5G wireless communication system is expected to address different use cases having quite different requirements in terms of data rate, latency, reliability, mobility, etc. However, it is expected that the design of the air-interface of the fifth generation wireless communication system would be flexible enough to serve the user equipments (UEs) having quite different capabilities depending on the use case and market segment the UE cater service to the end customer. Example use cases the 5G wireless communication system wireless system is expected to address is enhanced Mobile Broadband (eMBB), massive MTC (m-MTC), ultra-reliable low latency communication (URLL), etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the IoT/IoE envisioning connectivity of billions of devices. The URLL requirements like very low latency, very high reliability and variable mobility so on and so forth address the market segment representing the industrial automation application, vehicle-to-vehicle/vehicle-to-infrastructure communication foreseen as one of the enabler for autonomous cars.

In the 4G wireless communication system, an enhanced node B (eNB) or a base station in cell broadcasts system information. System information is structured into master information block (MIB) and a set of system information blocks (SIBs). MIB includes system frame number (SFN), downlink system bandwidth and physical hybrid automatic repeat request (ARQ) feedback indicator channel (PHICH) configuration. MIB is transmitted every 40 ms. It is repeated every 10 ms wherein the first transmission occurs in subframe #0 when SFN mod 4 equals zero. MIB is transmitted on physical broadcast channel (PBCH). System Information Block Type 1 carries cell identity, tracking area code, cell barring information, value tag (common for all scheduling units), and scheduling information of other SIBs. SIB 1 is transmitted every 80 ms in subframe #5 when SFN mod 8 equals zero. SIB 1 is repeated in subframe #5 when SFN mod 2 equals zero. SIB 1 is transmitted on physical downlink shared channel (PDSCH). Other SIBs (SIB 2 to SIB 19) are transmitted in system information (SI) messages wherein scheduling information of these SIBs are indicated in SIB 1.

The 5G wireless communication system is considering enhancement to deliver system information.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G) system.

Solution to Problem

In accordance with a first aspect of the present disclosure, a method by a terminal for transmitting a random access preamble in a wireless communication system is provided. The method comprises performing first beam sweeping to transmit the random access preamble to a base station using a plurality of transmission beams, determining whether a random access response is received corresponding to at least one transmission of the random access preamble during the first beam sweeping, determining a beam order of second beam sweeping if the random access response is not received corresponding to the at least one transmission of the random access preamble during the first beam seeping, wherein a first transmission beam used for the second beam sweeping is selected the same as a last transmission beam used for the first beam sweeping, and performing the second beam sweeping to retransmit the random access preamble to the base station based on the determined beam order of the second beam sweeping. The method may further comprise determining whether the terminal has information on the reciprocity of reception and transmission beams. The determining of the beam order of the second beam sweeping may be performed if the terminal does not have the information on the reciprocity of reception and transmission beams.

In accordance with a second aspect of the present disclosure, a terminal for transmitting a random access preamble is provided. The terminal comprises a transceiver configured to receive signals from a base station and transmit signals to the base station, and a controller coupled with the transceiver. The controller is configured to perform first beam sweeping to control the transceiver to transmit the random access preamble to the base station using a plurality of transmission beams, determine whether a random access response is received corresponding to at least one transmission of the random access preamble during the first beam sweeping, determine a beam order of second beam sweeping if the random access response is not received corresponding to the at least one transmission of the random access preamble during the first beam seeping, wherein a first transmission beam used for the second beam sweeping is selected the same as a last transmission beam used for the first beam sweeping, and perform the second beam sweeping to control the transceiver to retransmit the random access preamble to the base station based on the determined beam order of the second beam sweeping. The controller may be further configured to determine whether the terminal has information on the reciprocity of reception and transmission beams. The controller may be configured to determine the beam order of the second beam sweeping if the terminal does not have the information on the reciprocity of reception and transmission beams.

In accordance with a third aspect of the present disclosure, a method by a terminal for requesting system information is provided. The method comprises transmitting a request message including a random access (RA) preamble to a base station in a RA occasion, and receiving a system information message transmitted by the base station using a downlink transmission beam. At least one of the RA preamble or the RA occasion indicates the system information message which the terminal needs to request and the downlink transmission beam for transmitting the system information message.

In accordance with a fourth aspect of the present disclosure, a method by a base station for transmitting system information is provided. The method comprises receiving a request message including a random access (RA) preamble from a terminal in a RA occasion, and transmitting a system information message to the terminal using a downlink transmission beam. At least one of the RA preamble or the RA occasion indicates the system information message which the terminal needs to request and the downlink transmission beam for transmitting the system information message.

In accordance with a fifth aspect of the present disclosure, a terminal for requesting system information is provided. The terminal comprises a transceiver configured to receive signals from a base station and transmit signals to the base station, and a controller coupled with the transceiver. The controller is configured to control the transceiver to transmit a request message including a random access (RA) preamble to the base station in a RA occasion, and control the transceiver to receive a system information message transmitted by the base station using a downlink transmission beam. At least one of the RA preamble or the RA occasion indicates the system information message which the terminal needs to request and the downlink transmission beam for transmitting the system information message.

In accordance with a sixth aspect of the present disclosure, a base station for transmitting system information is provided. The base station comprises a transceiver configured to receive signals from a terminal and transmit signals to the terminal, and a controller coupled with the transceiver. The controller is configured to control the transceiver to receive a request message including a random access (RA) preamble from the terminal in a RA occasion, and control the transceiver to transmit a system information message to the terminal using a downlink transmission beam. At least one of the RA preamble or the RA occasion indicates the system information message which the terminal needs to request and the downlink transmission beam for transmitting the system information message.

Other aspects, advantages, and salient features of the disclosure will become apparent to those skilled in the art from the following detailed description, which, taken in conjunction with the annexed drawings, discloses various embodiments of the disclosure.

Advantageous Effects of Invention

The disclosure reduces the delay in random access procedure as it enables a terminal to ramp up power during retransmission when there is no TX/RX beam reciprocity at the terminal.

The disclosure also enables a base station to identify the downlink TX beam information from the received random access channel (RACH) preamble and/or RACH occasion in which RACH preambles is received in addition to identifying the SI message(s) which are requested by a terminal. So the base station can transmit a system information (SI) request acknowledge (ACK) and the requested SI message(s) using the selective downlink TX beam(s) based on the identified downlink TX beam information. The reduced transmission results in significant signaling overhead reduction, power consumption and interference reduction.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR THE INVENTION

Figure 1:
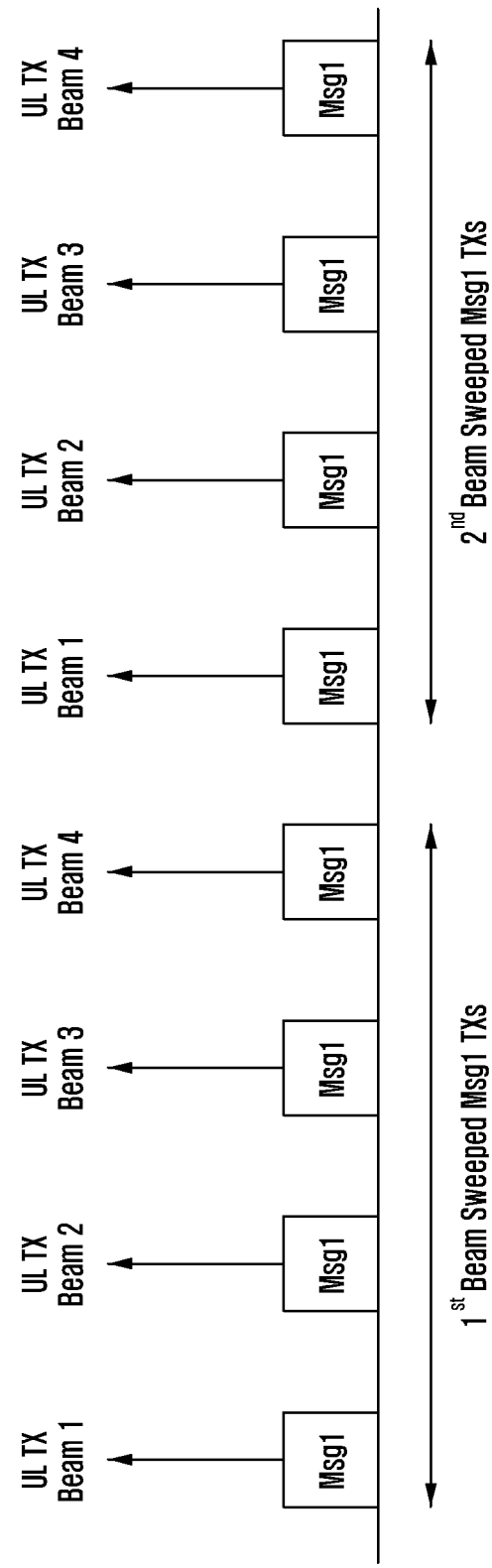
FIG. 1 illustrates beam sweeped Msg1 transmissions.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), 5G NB (5GNB), or gNB.

Beam Order During UE TX Beam Sweeping

Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make a plurality of transmit beam patterns of different directions. Each of these transmit beam patterns can be also referred as transmit (TX) beam. Wireless communication system operating at high frequency uses a plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make a plurality of receive (RX) beam patterns of different directions. Each of these receive patterns can be also referred as receive (RX) beam.

TX/RX beam correspondence at gNB holds if at least one of the following is satisfied:
  gNB is able to determine a gNB RX beam for the uplink reception based on UE's downlink measurement on gNB's one or more Tx beams.
  gNB is able to determine a gNB TX beam for the downlink transmission based on gNB's uplink measurement on gNB's one or more RX beams TX/RX beam correspondence or reciprocity at UE holds if at least one of the following is satisfied:
  UE is able to determine a UE TX beam for the uplink transmission based on UE's downlink measurement on UE's one or more RX beams.
  UE is able to determine a UE RX beam for the downlink reception based on TRP's indication based on uplink measurement on UE's one or more TX beams.

Random access (RA) procedure is used to achieve uplink time synchronization. RA procedure is used during initial access, handover, RRC connection re-establishment procedure, scheduling request transmission, secondary cell group (SCG) addition/modification and data or control information transmission in uplink by non-synchronized UE in RRC CONNECTED state. During the RA procedure, UE first transmits Random Access Preamble (also referred as Msg1) and then waits for Random Access Response (RAR) or Msg2 in the RAR window corresponding to its Random Access Preamble transmission. If there is no reception (RX)/transmission (TX) beam correspondence or reciprocity at UE, UE cannot uniquely identify an uplink (UL) TX beam for Msg1 (i.e., a random access channel (RACH) preamble) transmission. A RACH preamble may be referred as a random access (RA) preamble or a physical random access channel (PRACH) preamble. UE will transmit Msg1 using TX beam sweeping, i.e., the UE uses different TX beam during Msg1 re-transmission.

FIG. 1 illustrates beam sweeped Msg1 transmissions.

Referring to FIG. 1, there are 4 UL TX beams at UE. UE transmit $1^{st}$ Msg1 using TX beam 1. If Msg1 transmission is not successful using TX beam 1, UE retransmits Msg1 using TX beam 2. If Msg1 transmission is not successful using TX beam 2, UE retransmits Msg1 using TX beam 3. If Msg1 transmission is not successful using TX beam 3, UE retransmits Msg1 using TX beam 4. These Msg1 (re-) transmission using different TX beams can be referred as Msg1 transmissions using beam sweeping. If Msg1 transmission is not successful even after transmitting Msg1 using beam sweeping, UE retransmits Msg1 using beam sweeping again. In other words, the UE perform second beam sweeping to transmit Msg1. The order of TX beams during second beam sweeping can be same as previous first beam sweeping, i.e., as shown in FIG. 1, TX beam 1, TX beam 2, TX beam 3 and then TX beam 4.

According to current standard, if UL TX beam used for $n^{th}$ (where n>1) Msg1 transmission is different from UL TX beam used for n-$1^{th}$ Msg1 transmission during a RA procedure then power is not ramped up (i.e., power ramping counter is not updated) for $n^{th}$ Msg1 transmission. So in FIG. 1, all the Msg1 transmissions in $1^{st}$ beam sweeping as well as $2^{nd}$ beam sweeping will be transmitted using same power. Power is never ramped up. This is not efficient and Msg1 transmissions cannot be successful without power ramping.

In order to solve this problem, if there is no reception (RX)/transmission (TX) beam correspondence or reciprocity at UE, the first UL TX beam for $N^{th}$ beam sweeping may be selected the same as the last UL TX beam selected for n-$1^{th}$ beam sweeping for N>1. The remaining UL TX beams during the beam sweeping are selected such that each selected UL TX beam is different. In other words, if there is no reception (RX)/transmission (TX) beam correspondence or reciprocity at UE, UL TX beam for $(x*K+1)^{th}$ Msg1 transmission (where x=1, 2, 3 and so on . . . , K is number of UL TX beams) is selected by UE is same as the UL TX beam selected for $(x*K)^{th}$ Msg1 transmission. In other words, if there is no reception (RX)/transmission (TX) beam correspondence or reciprocity at UE, UL TX beam for $p^{th}$ Msg1 transmission is selected by UE is same as the UL TX beam selected for (p−1)th msg1 transmission if p mod K=1 where K is number of UL TX beams. If p mod K is not equal to one, UL TX beam for $p^{th}$ Msg transmission is selected such that selected UL TX beam is different from UL TX beam selected for previous '[(p mod K)−1]' Msg1 transmissions.

Figure 2:
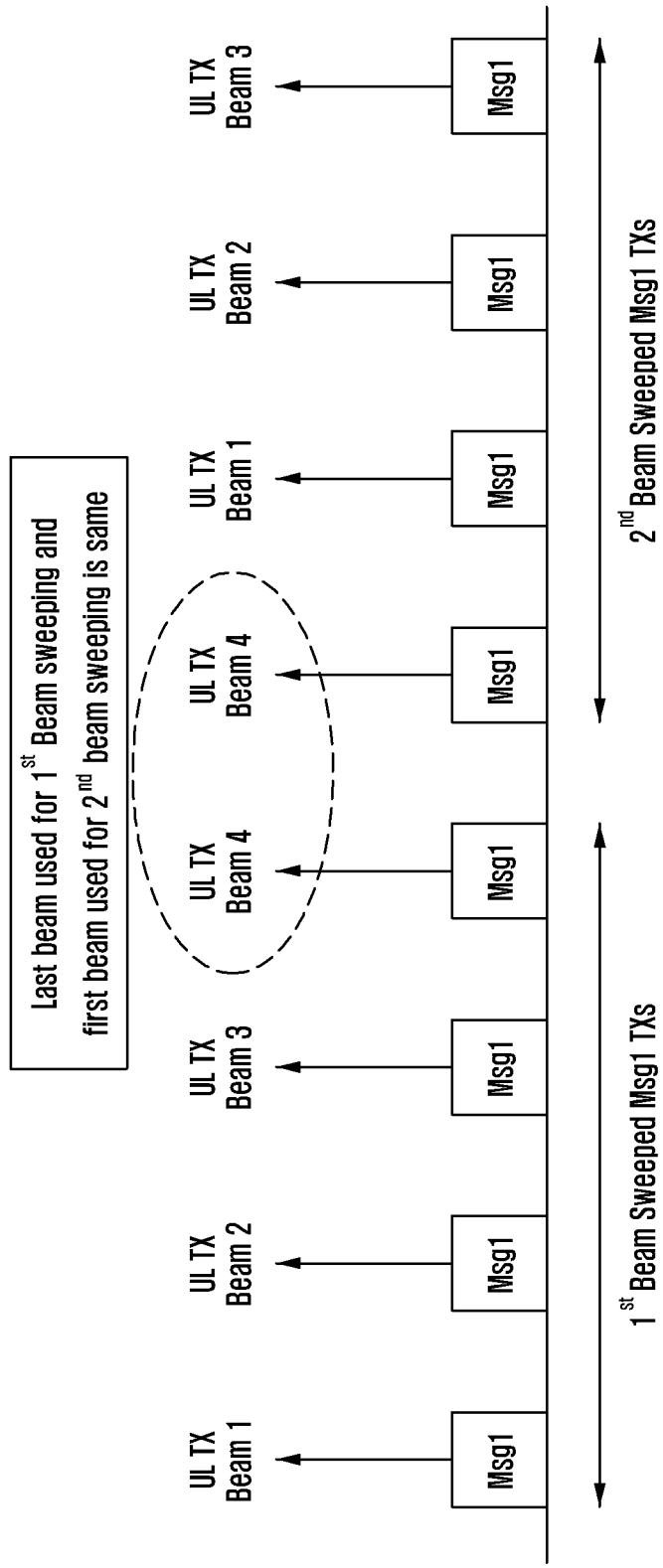
FIG. 2 illustrates enhanced beam sweeped Msg1 transmissions according to an embodiment of the disclosure.

FIG. 2 illustrates enhanced beam sweeped Msg1 transmissions according to an embodiment of the disclosure.

As shown in FIG. 2, last UL TX beam used for $1^{st}$ beam sweeping and first UL TX beam used for $2^{nd}$ beam sweeping is same. As a result power will be ramped when transmitting Msg1 using first TX beam in $2^{nd}$ beam sweeping.

Figure 3:
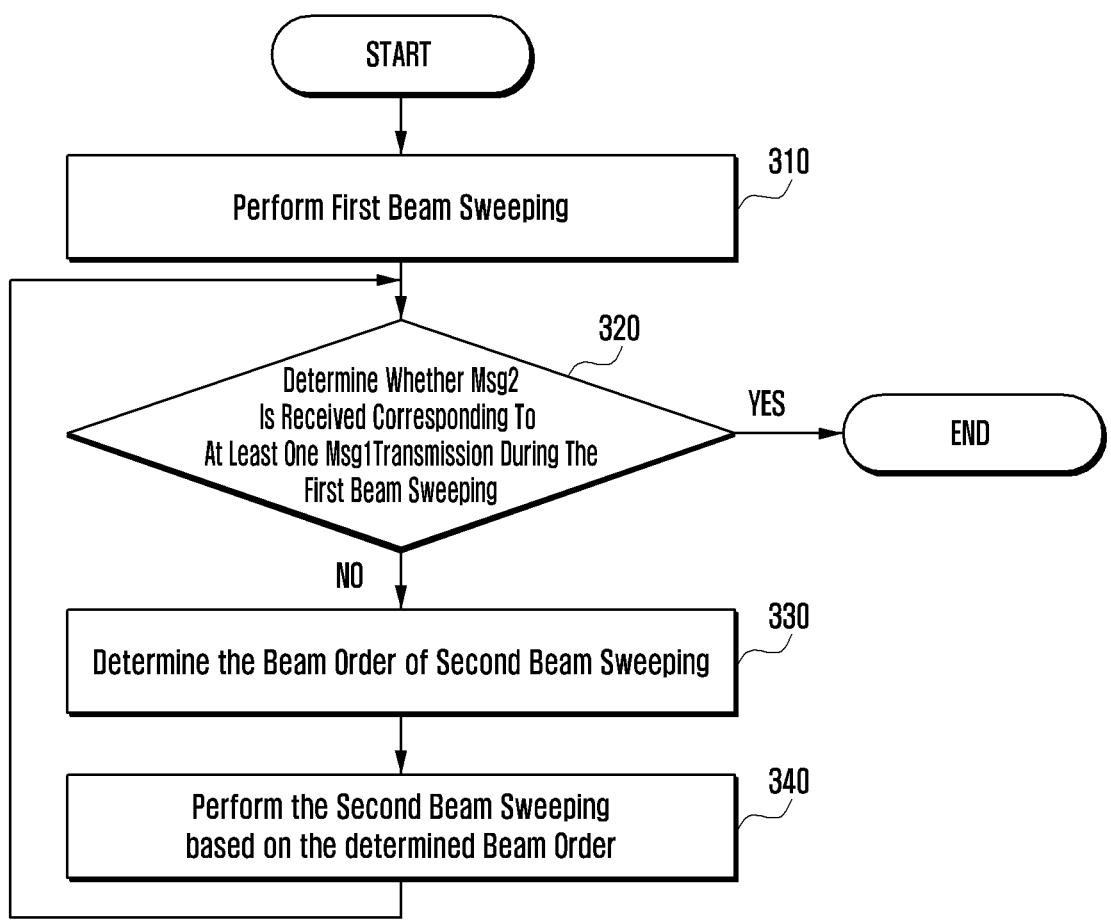
FIG. 3 illustrates a UE procedure for performing enhanced beam sweeped Msg1 transmissions according to an embodiment of the disclosure.

FIG. 3 illustrates a UE procedure for performing enhanced beam sweeped Msg1 transmissions according to an embodiment of the disclosure.

Referring to FIG. 3, the UE performs first beam sweeping to transmit a Msg1 (i.e., a RACH preamble) to a base station using a plurality of TX beams at operation 310. As shown in FIG. 2, the UE may transmit the Msg1 using TX beam 1; retransmit the Msg1 using TX beam 2 if Msg2 is not received corresponding to the Msg1 transmitted using TX beam 1; retransmit the Msg1 using TX beam 3 if Msg2 is not received corresponding to the Msg1 transmitted using TX beam 2; and then retransmit the Msg1 using TX beam 4 corresponding to Msg1 transmitted using TX beam 3, during the first beam sweeping.

The UE determines whether Msg2 is received corresponding to at least one Msg1 transmission during the first beam sweeping operation 320. If Msg2 is received corresponding to at least one Msg1 transmission during the first beam sweeping, there is no need to perform second beam sweeping to retransmit Msg1. However, if it is determined that Msg2 is not received corresponding to at least one Msg1 transmission during the first beam sweeping, the UE performs second beam sweeping to retransmit the Msg1 at operation 340.

In order to perform the second beam sweeping, the UE determines the beam order of the second beam sweeping at operation 330. As described above, the UE selects the first UL TX beam used for the second beam sweeping the same as the last UL TX beam used for the first beam sweeping. As shown in FIG. 2, for example, the UE may select the first UL TX beam for the second beam sweeping as TX beam 4 which is the last UL TX beam selected for the first beam sweeping.

The UE performs the second beam sweeping to retransmit the Msg1 to the base station based on the determined beam order at operation 340. As shown in FIG. 2, for example, the UE may retransmit the Msg1 using TX beam 4; retransmit the Msg1 using TX beam 1 if Msg2 is not received corresponding to the Msg1 transmitted using TX beam 4; retransmit the Msg1 using TX beam 2 if Msg2 is not received corresponding to the Msg1 transmitted using TX beam 1; and then retransmit the Msg1 using TX beam 3 if Msg2 is not received corresponding to the Msg1 transmitted using TX beam 2, during the second beam sweeping.

In the above procedure during each Msg1 transmission, power is ramped up if the UL TX beam selected is the same as UL TX beam selected for immediately previous Msg1 transmission, whereas the power is not ramped up if the UL TX beam selected is different from UL TX beam selected for immediately previous Msg1 transmission. Therefore, the UE may identify whether the UL TX beam selected is different from UL TX beam selected for immediately previous Msg1 transmission, and the UE may determine whether to ramp up the transmission power based on the identification. For example, since the first UL TX beam used for the second beam seeping in FIG. 2 is selected as 'UL TX beam 4,' which is the same as UL TX beam selected for immediately previous Msg1, i.e., the last UL TX beam used for the first beam sweeping, the UE ramps up the transmission power of the first UL TX beam used for the second beam seeping than that of the last UL TX beam used for the first beam sweeping, and retransmits the Msg1 using TX beam 4 with the ramped-up transmission power. On the contrary, since the second UL TX beam used for the second beam seeping in FIG. 2 is selected as 'UL TX beam 1,' which is different from 'UL TX beam 4' selected for immediately previous Msg1, i.e., the first UL TX beam used for the second beam seeping, the UE does not ramp up the transmission power of the second UL TX beam used for the second beam seeping, and retransmits the Msg1 using TX beam 1 with the same transmission power as that of the first UL TX beam used for the second beam seeping.

Meanwhile, the above-described method may be performed only if there is no RX/TX beam reciprocity at the UE. Therefore, the UE may determine whether there is no RX/TX beam reciprocity at the UE, and select UL TX beams if there is no RX/TX beam reciprocity at the UE.

DL TX Beam Identification for Msg1 Based SI Request

In the 5G wireless communication system information (SI) is divided into minimum SI and other SI. Similar to LTE system information, other SI can be structured into a set of SI-blocks (SIBs).

Minimum SI is periodically broadcast. Other SI can be broadcasted or provided on-demand based on UE request. The minimum SI includes basic information required for initial access to a cell and information for acquiring any other SI broadcast periodically or provisioned via on-demand basis. The minimum SI includes at least system frame number (SFN), list of public land mobile network (PLMN), cell ID, cell camping parameters, and RACH parameters. If network allows on demand mechanism, parameters required for requesting other SI-block(s) (if any needed, e.g., RACH preambles for request) are also included in minimum SI.

The scheduling information in minimum SI includes an indicator which indicates whether the concerned SI message is being broadcasted or provided on demand. The scheduling information for the other SI includes SIB type, validity information, SI periodicity and SI-window information. The scheduling information for the other SI is provided irrespective of whether the other SI is being broadcasted or not. If minimum SI indicates that a SI message is not broadcasted (i.e., it is provided on demand), then UE does not assume that this SI message is a broadcasted in its SI-window at every SI period. Therefore the UE may send an SI request to receive this SI message.

For the Msg1 based SI request, gNB signals Random Access Resources (PRACH preamble(s) and/or PRACH time/frequency resources) in system information (e.g. SIB1). Depending on gNB implementation, gNB can configure one of the following to indicate the requested SI(s):

1) Association or mapping between PRACH preambles and SI messages. A PRACH preamble can be associated or mapped to one or more SI messages.

2) Association or mapping between PRACH occasions (time/frequency resource) and SI messages. A PRACH occasion can be associated or mapped to one or more SI messages.

3) Association or mapping between PRACH preambles & PRACH occasions (time/frequency resource) and SI messages. A PRACH occasion can be mapped to multiple SI messages. One or more SI messages associated to same PRACH occasion can be associated to different PRACH preambles.

For SI request, UE selects PRACH preamble and/or PRACH occasion corresponding to SI message the UE needs. The UE then transmits a Msg1 using the selected PRACH preamble and/or PRACH occasion. On receiving the SI request, gNB sends SI Request ACK in Msg2 to the UE's SI request sent in Msg1. A random access preamble identifier (RAPID) is included in Msg2. For Msg2 reception, the UE monitors PDCCH addressed to random access-radio network temporary identifier (RA-RNTI) that corresponds to the Msg1 transmitted by the UE. Upon receiving the SI Request ACK, UE monitors the SI window of the requested SI message in one or more SI periods of the requested SI message. In this procedure, upon receiving Msg1, based on received PRACH preamble in a PRACH occasion (i.e., time/frequency random access resource) and mapping between PRACH preambles and/or PRACH occasions and SI messages, GNB can identify the SI message(s) requested by UE. GNB broadcasts the requested SI message(s) in in one or more SI periods of the requested SI message(s). The drawbacks of the above procedure are as follows:

Beam formed SI Request ACK Transmission: In a system using beam forming, Msg2, i.e., SI Request ACK is transmitted using beam forming. According to the current procedure, the gNB cannot identify the downlink TX beam for SI Request ACK based on received Msg1. So the gNB needs to transmit the Msg2, i.e., SI Request ACK using all downlink TX beams. This leads to significant signaling overhead in a system with large number of beams. In order to minimize the overhead of Msg2, in the disclosure it is proposed to indicate the information about the DL TX beam in addition to requested SI message(s) to enable gNB to identify the downlink TX beam information from the detected preamble and/or RACH occasion in addition to identifying the SI message(s) which are requested by UE.

Beam formed SI Message Transmission: In a system using beam forming, the requested SI message is also transmitted using beam forming in SI window. According to the current procedure, the gNB cannot identify the downlink TX beam for SI message transmission. So the gNB needs to transmit the requested SI message(s) using all downlink TX beams. If the gNB is able to identify the downlink TX beam based on received Msg1, the gNB can transmit SI message using that beam. In case multiple Msg1s requesting the same SI message is received during a SI period, then gNB can transmit SI message using the downlink TX beam(s) corresponding to each of the received Msg1. This can reduce the signaling overhead of transmitting SI message as SI message need not be transmitted always using all the downlink TX beams. In order to minimize the overhead, in the disclosure it is proposed to indicate the information about the DL TX beam in addition to requested SI message(s) to enable gNB to identify the downlink TX beam information from the detected preamble and/or RACH occasion in addition to identifying the SI message(s) which are requested by UE.

In the disclosure, a gNB signals information on the random access resources (PRACH preambles and/or PRACH occasions) for SI request. Random access resources are not only mapped to SI message(s) but also to DL TX beams (or SS blocks). If a UE needs to acquire SI message which is not being broadcasted by the gNB, the UE initiates the SI request procedure. The UE first selects an SS block. If there is at least one SS block for which the signal quality (i.e., reference signal received power (RSRP) or reference signal received quality (RSRQ)) is above the threshold (threshold is signaled by the gNB in system information, e.g., SIB1), the UE selects an SS block with signal quality above the threshold. Otherwise the UE selects any SS block.

The UE then selects a random access preamble corresponding to the selected SS block from random access preamble(s) corresponding to SI message(s) the UE intends to request from gNB.

UE then selects a PRACH occasion corresponding to the selected SS block from RACH occasions corresponding to SI message(s) the UE intends to request from gNB.

In the selected RACH occasion, the UE transmits the selected random access preamble and monitors PDCCH addressed to RA-RNTI for receiving Msg2.

gNB upon receiving the Msg1, identifies the SS block from PRACH preamble and/or PRACH occasion corresponding to the received Msg1. gNB then transmits SI request ACK in Msg2 using the DL TX beam corresponding to the identified SS block. gNB also transmits the requested SI message(s) using the DL TX beam or DL TX beams(s) corresponding to the identified SS block. gNB may transmit the requested SI message(s) using the DL TX beams corresponding one or more SS blocks around the identified SS block.

The various methods of mapping between random access resources and DL TX beams (or SS blocks) and SI messages are explained below.

Embodiment 1: gNB Configures Association Between a Synchronization Signal (SS) Block and a Subset of Preambles. RACH Occasions are Common for All SS Blocks In order to indicate a requested SI message in addition to a downlink TX beam, PRACH preambles for SI message or set of SI messages can be reserved from each subset of PRACH preambles associated with SS block(s). So UE selects a PRACH preamble corresponding to the selected SS block and SI message. However due to limitation of PRACH preambles in each subset, this may not be always feasible. So association between one or more SI messages and a subset of RACH occasions can be configured in this case. For Msg1 based SI request, the UE selects a PRACH preamble from a subset of PRACH preambles corresponding to SS block; the UE selects a PRACH occasion corresponding to SI message(s) which the UE needs to request. If association between SS block and a subset of preambles is configured to indicate a downlink TX beam then for Msg1 based SI request, association between one or more SI messages and a subset of RACH occasions can be configured by gNB.

Embodiment 2: gNB Configures Association Between a SS Block and a Subset of RACH Occasions. Preambles are Common for All SS Blocks In order to indicate a requested SI message in addition to a downlink TX beam, preambles can be reserved for each SI message or set of SI messages. It is also possible to reserve PRACH occasions for SI message or set of SI messages for each subset of PRACH occasions associated with SS block(s) depending on availability of PRACH occasions in each set.

If association between a SS block and a subset of PRACH occasions is configured to indicate a downlink TX beam then for Msg1 based SI request, either association between one or more SI messages and a preamble or association between one or more SI messages and a RACH occasion for each subset of RACH occasions associated with SS blocks can be configured.

Embodiment 3: gNB Configures Association Between SS Block(S) and a Subset of RACH Occasions and a Subset of Preamble Indices For example, if there are 8 SS blocks, four sets of RACH occasions can be configured where each set is mapped to 2 SS blocks. Two sets of preamble indices can be configured. Each set of preamble indices is mapped to one of 2 SS block mapped to the same PRACH occasion set. In order to indicate a requested SI message in addition to a downlink TX beam, preambles for SI message or set of SI messages can be reserved for each subset of preambles associated with SS block(s). Alternately, PRACH occasions for SI message or set of SI messages from each subset of PRACH occasions associated with SS block(s) can be configured depending on availability of PRACH occasions in each set.

If association between SS blocks and a subset of PRACH occasions and a subset of preambles is configured to indicate a downlink TX beam then for Msg1 based SI request, either association between one or more SI messages and a subset of preambles associated with SS block(s) or association between one or more SI messages and a RACH occasion from each subset of RACH occasions associated with SS blocks can be configured.

Figure 4:
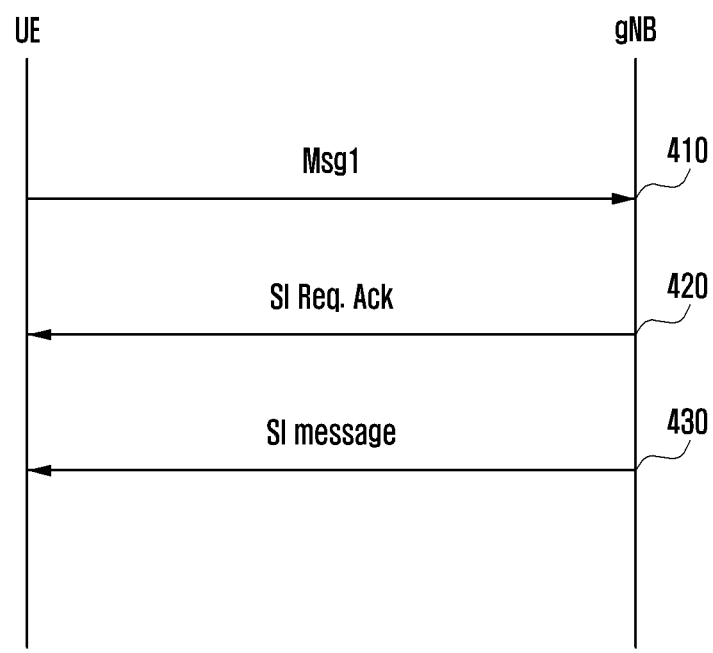
FIG. 4 illustrates a procedure for Msg1 based SI request according to an embodiment of the disclosure.

FIG. 4 illustrates a procedure for Msg1 based SI request according to an embodiment of the disclosure.

Referring to FIG. 4, UE transmits a Msg1 (i.e., RA preamble) for requesting in a RA occasion at operation 410. Time/frequency resources are referred as PRACH occasions or RA occasion(s). The RA preamble or the RA occasion may indicate a system information message which the terminal needs to request and a downlink transmission beam for transmitting the system information message.

For example, an RA preamble may indicate a system information message which the terminal needs to request and/or a downlink transmission beam for transmitting the system information message. A gNB may configure association between a SS block and a subset of RA preambles to indicate a downlink TX beam. The gNB may transmit the association between the SS block and the subset of preambles in RACH configuration information. Furthermore, in order to indicate a requested SI message in addition to a downlink TX beam, RA preambles for SI message or set of SI messages can be reserved from each subset of RA preambles associated with SS block(s). So, a UE may receive one or more SS block from the gNB; may select a SS block among the one or more SS blocks to determine a downlink transmission beam based on the measurement on the one or more SS blocks; and may select a RA preamble corresponding to the selected SS block and/or the SI message which the UE needs to request. The UE may transmit the selected preamble to request an SI information message corresponding to the selected preamble. In order words, an RA preamble may indicate that the gNB needs to transmit an SI information message corresponding to the RA preamble. The selected preamble may correspond to an SS block transmitted from the gNB using a downlink TX beam, and indicates that the gNB needs to transmit an SI information message (and an SI request ACK) using the downlink TX beam. The downlink transmission beam may be indicated based on an index of the selected SS block.

An RA occasion may indicate a system information message which the terminal needs to request and/or a downlink transmission beam for transmitting the system information message. A gNB may configure association between a SS block and a subset of RA occasions to indicate a downlink TX beam. The gNB may transmit the association between the SS block and the subset of occasion in RACH configuration information. Furthermore, in order to indicate a requested SI message in addition to a downlink TX beam, it is possible to reserve RA occasions for SI message or set of SI messages for each subset of RA occasions associated with SS block(s). So, a UE may receive one or more SS block from the gNB; may select a SS block among the one or more SS blocks to determine a downlink transmission beam based on the measurement on the one or more SS blocks; and may select a RA occasion corresponding to the selected SS block and/or the SI message which the UE needs to request. The UE may transmit an RA preamble in the selected occasion to request an SI information message corresponding to the selected occasion. In order words, an RA occasion may indicate that the gNB needs to transmit an SI information message corresponding to the RA occasion. The selected occasion may correspond to an SS block transmitted from the gNB using a downlink TX beam, and indicates that the gNB needs to transmit an SI information message (and an SI request ACK) using the downlink TX beam. The downlink transmission beam may be indicated based on an index of the selected SS block.

Accordingly, in an embodiment, an RA preamble may indicate a system information message which the terminal needs to request, and an RA occasion may indicate a downlink transmission beam for transmitting the system information message. In an alternative embodiment, an RA occasion may indicate a system information message which the terminal needs to request and an RA preamble may indicate a downlink transmission beam for transmitting the system information message.

Specifically, according to Embodiment 1, a gNB may configure association between a SS block and a subset of preambles. For Msg1 based SI request, a UE may select a RA preamble from a subset of RA preambles corresponding to SS block, and the UE may select a RA occasion corresponding to SI message(s) which the UE needs to request.

According to Embodiment 2, a gNB may configure association between a SS block and a subset of RA occasions. In order to indicate a requested SI message in addition to a downlink TX beam, RA preambles can be reserved for each SI message or set of SI messages. It is also possible to reserve RA occasions for SI message or set of SI messages for each subset of RA occasions associated with SS block(s) depending on availability of RA occasions in each set. In other words, an RA preamble may indicate a system information message which the terminal needs to request, and an RA occasion may indicate a system information message which the terminal needs to request and/or a downlink transmission beam for transmitting the system information message.

According to Embodiment 3, a gNB may configure association between SS block(s) and a subset of RA occasions and a subset of preamble indices. In order to indicate a requested SI message in addition to a downlink TX beam, preambles for SI message or set of SI messages can be reserved for each subset of preambles associated with SS block(s). Alternately, RA occasions for SI message or set of SI messages from each subset of RA occasions associated with SS block(s) can be configured depending on availability of RA occasions in each set.

The gNB transmits an SI message to the UE at operation 430. Specifically, the gNB transmits the request SI message indicated by an RA preamble or an RA occasion using a downlink transmission beam indicated by the RA preamble or the RA occasion.

In an embodiment, the gNB may transmit an SI request ACK to the UE at operation 420. The gNB may transmit the SI request ACK using the downlink transmission beam indicated by the RA preamble or the RA occasion.

Contention Based Random Access in RRC Connected

A UE in RRC_CONNECTED may initiate contention based random access (CBRA) procedure for various events e.g., to request UL grant. In case of CBRA, after receiving the Msg1, gNB can neither identify the UE nor the state of UE which has transmitted the Msg1. So, after receiving the Msg1, gNB will transmit the PDCCH for a RAR in PDCCH control resource set (CORESET) configured in RACH configuration.

A UE in RRC_CONNECTED is configured with one or more active DL bandwidth parts (BWPs).

Figure 5:
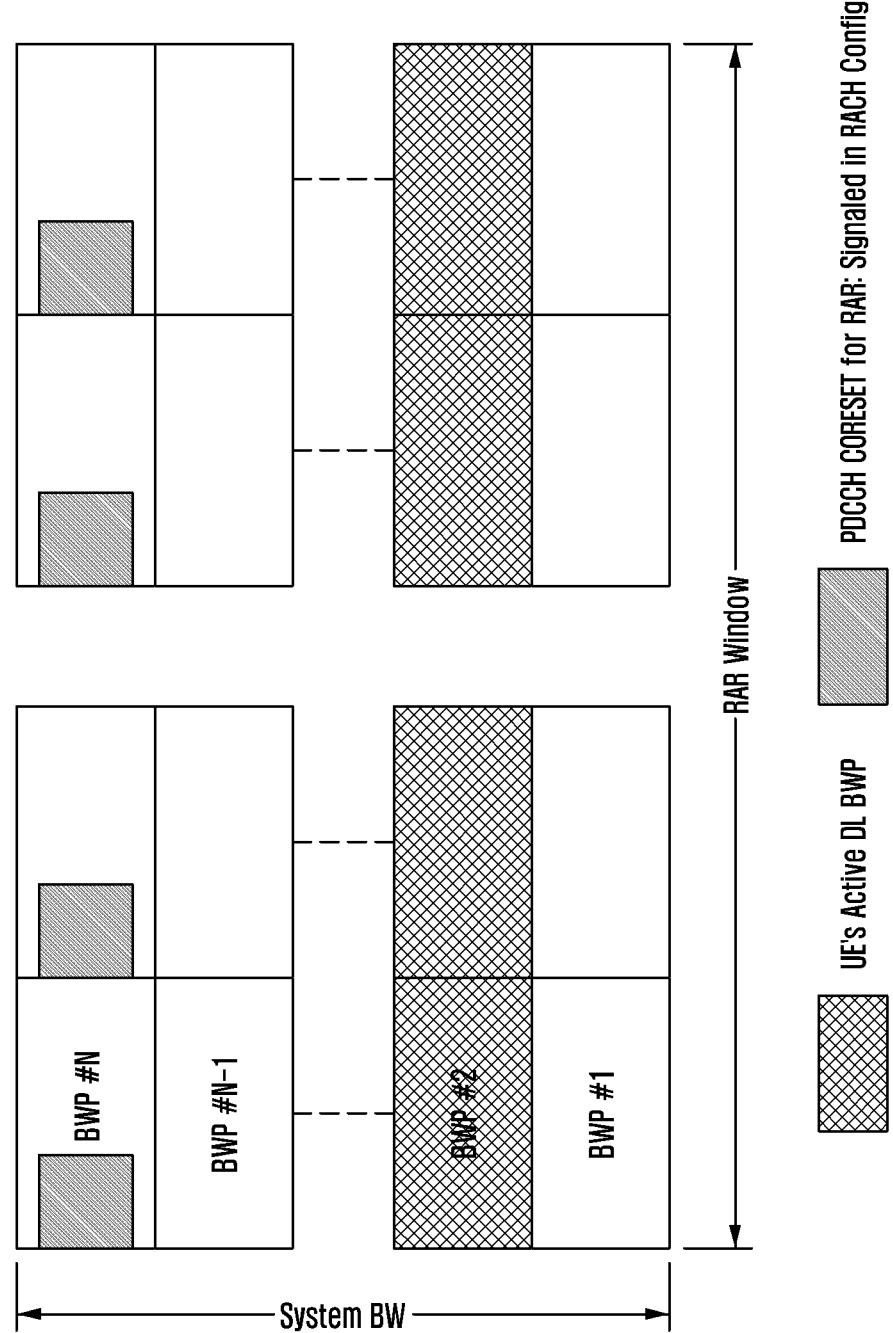
FIG. 5 illustrates PDCCH CORESET configured in RACH configuration.

FIG. 5 illustrates PDCCH CORESET configured in RACH configuration.

Referring to FIG. 5, PDCCH CORESET configured in RACH configuration may not correspond to active downlink (DL) BWP of the UE. If the PDCCH CORESET configured in RACH configuration does not correspond to active DL BWP of the UE, UE may not be able to receive the RAR in its active DL BWP.

A UE can receive RAR in its active DL BWP if gNB transmits the PDCCH for RAR in all the active DL BWPs in addition to PDCCH CORESET indicated in RACH configuration. This approach is very inefficient as gNB has to do this for every Msg1 received by the gNB. So it is proposed in the disclosure that UE prioritizes monitoring the DL BWP in which PDCCH for RAR and RAR are scheduled over monitoring the active DL BWPs.

In case of CBRA, UE also needs to receive PDCCH for Msg3 retransmissions. PDCCH for Msg3 retransmission can be transmitted in PDCCH CORESET for RAR or PDCCH CORESET for Msg3 retransmission may be indicated in RAR. Radio layer 1 (RANI) has not yet decided the PDCCH CORESET to be used for Msg3 retransmission. Irrespective of which PDCCH CORESET is used for scheduling Msg3 retransmissions, PDCCH CORESET for scheduling Msg3 retransmissions may not always correspond to active DL BWP of the UE. Similar to RAR reception, it is proposed in the disclosure that UE prioritizes monitoring the DL BWP in which PDCCH for Msg3 retransmissions is scheduled over monitoring the active DL BWPs.

In case of CBRA, UE also needs to receive PDCCH for Msg4 and Msg4 for contention resolution. RRC_CONNECTED UE includes its C-RNTI in Msg3. Based on C-RNTI, gNB can identify the UE and transmit the PDCCH for Msg4 and Msg4 in UE's active DL BWP. For CBRA, UE receives the PDCCH for Msg4 and Msg4 in its active DL BWP. In an alternate embodiment, similar to RAR reception, it is proposed that UE prioritizes monitoring the DL BWP in which PDCCH for Msg4 and Msg4 are scheduled over monitoring the active DL BWPs.

In case of contention-free random access (CFRA), based on received Msg1, gNB can identify the UE. So the gNB can send the PDCCH for RAR and RAR in active DL BWP of the UE. There is no need to monitor other DL BWPs. For CFRA, UE receives the PDCCH for RAR and RAR in its active DL BWP.

Random Access Backoff

Figure 6:
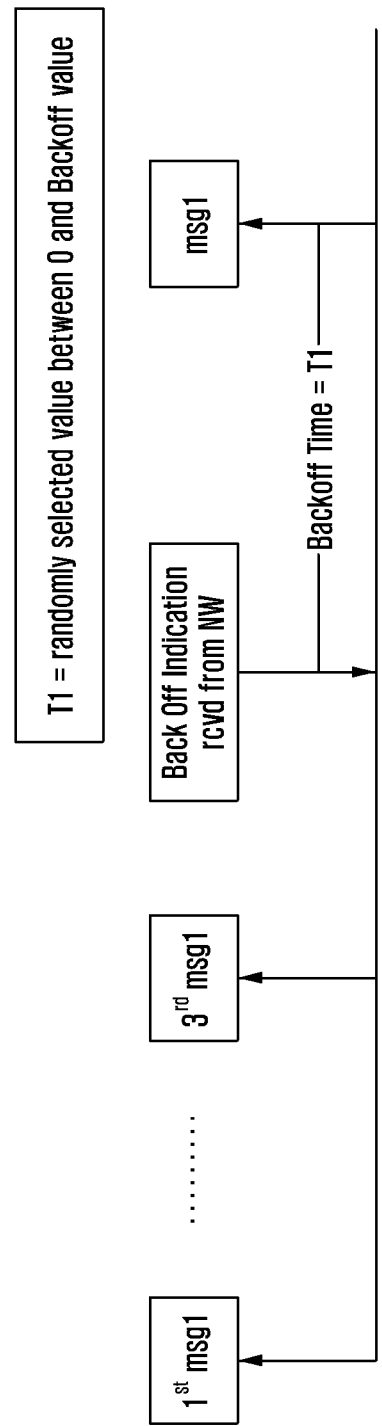
FIG. 6 illustrates random access backoff according to the related art.

FIG. 6 illustrates random access backoff according to the related art.

During the random access procedure, UE first transmits the PRACH preamble and then waits for RAR in the RAR window corresponding to its RACH preamble transmission. Sometimes due to congestion on PRACH channel, PRACH preamble transmission may not be successful. In the current system, in such a situation, network sends RAR with back off indicator/index. UE then backs off i.e., the UE retransmits PRACH preamble after a time period which is randomly selected between 0 and backoff value as shown in FIG. 6. The backoff value is obtained by the UE from a backoff table corresponding to the backoff index received in the RAR. All UEs perform backoff in similar manner. This is not efficient. So random access backoff mechanism needs to be enhanced.

Figure 7:
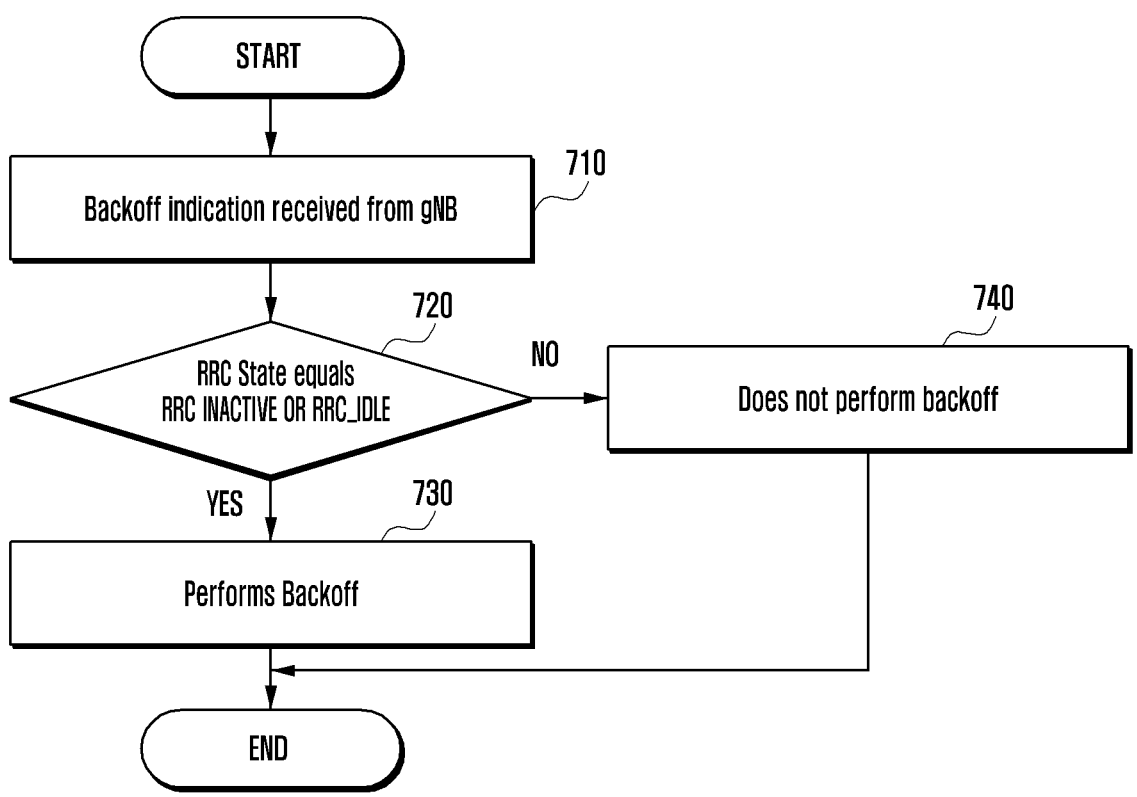
FIG. 7 illustrates UE procedure for enhanced random access backoff according to Embodiment 1 of the disclosure.

Embodiment 1: FIG. 7 illustrates UE procedure for enhanced random access backoff according to Embodiment 1 of the disclosure.

Referring to FIG. 7, UE receives backoff indication from network (i.e., gNB) at operation 710. After receiving the backoff indication from the network, the UE determines to backoff or not based on the UE state at operation 720. If the UE is RRC_IDLE/INACTIVE state, the UE performs the back off at operation 730. If the UE is in RRC_CONNECTED state, the UE does not perform backoff at operation 740.

Figure 8:
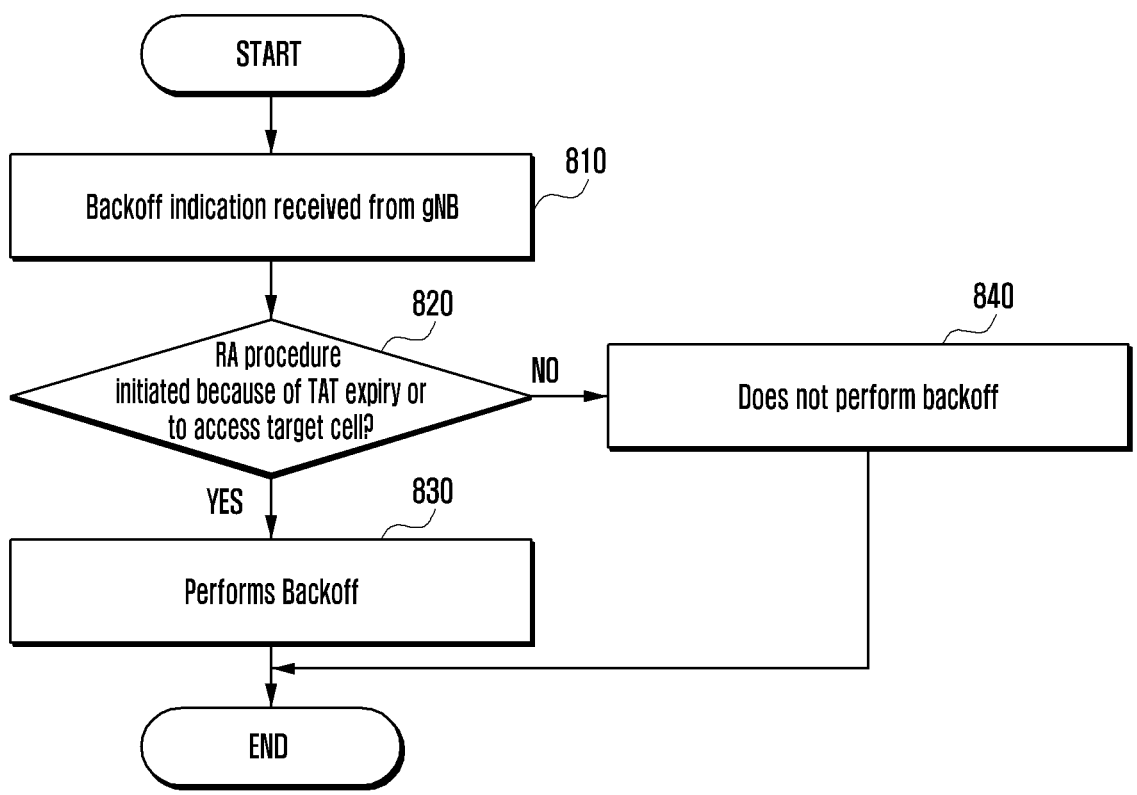
FIG. 8 illustrates UE procedure for enhanced random access backoff according to Embodiment 2 of the disclosure.

Embodiment 2: FIG. 8 illustrates UE procedure for enhanced random access backoff according to Embodiment 2 of the disclosure.

Referring to FIG. 8, UE receives backoff indication from network (i.e., gNB) at operation 810. After receiving the backoff indication from the network, the UE determines to backoff or not based on whether RA procedure is initiated because of TAT expiry and whether RA procedure is initiated to access target cell at operation 820. If the RA procedure is neither initiated because of TAT expiry nor to access target cell, the UE performs the back off at operation 830. The UE does not perform backoff at operation 840 if random access procedure is initiated because of TAT timer expiry. In an embodiment, after receiving the backoff indication from network, the UE does not perform backoff at operation 840 if random access procedure is initiated to access the target cell during handover.

Figure 9:
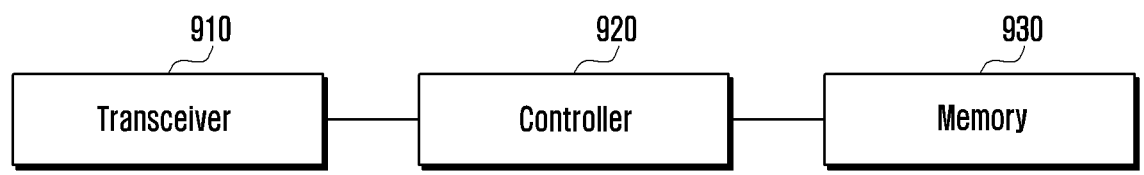
FIG. 9 is a block diagram of a terminal according to an embodiment of the disclosure.

FIG. 9 is a block diagram of a terminal according to an embodiment of the disclosure.

Referring to FIG. 9, the terminal includes a transceiver 910, a controller 920 and a memory 930. The transceiver 910, the controller 920 and the memory 930 are configured to perform the operations of the UE illustrated in the figures, e.g., FIGS. 1 to 8, or described above. Although the transceiver 910, the controller 920 and the memory 930 are shown as separate entities, they may be realized as a single entity like a single chip. Or, the transceiver 910, the controller 920 and the memory 930 may be electrically connected to or coupled with each other.

The transceiver 910 may transmit and receive signals to and from other network entities, e.g., a base station.

The controller 920 may control the UE to perform functions according to one of the embodiments described above.

In accordance with an aspect of the present disclosure, for example, the controller 920 may control the UE to transmit a random access preamble in a wireless communication system. As illustrated in FIG. 3, the controller 920 may be configured to perform first beam sweeping to control the transceiver 910 to transmit a random access preamble to a base station using a plurality of transmission beams, to determine whether a random access response is received corresponding to at least one transmission of the random access preamble during the first beam sweeping, to determine a beam order of second beam sweeping if the random access response is not received corresponding to the at least one transmission of the random access preamble during the first beam seeping, and to perform the second beam sweeping to control the transceiver 910 to retransmit the random access preamble to the base station based on the determined beam order of the second beam sweeping. As illustrated in FIG. 2, the controller 920 may select a first transmission beam used for the second beam sweeping the same as a last transmission beam used for the first beam sweeping. The controller 920 may be further configured to determine whether the terminal has information on the reciprocity of reception and transmission beams. The controller 920 may be configured to determine the beam order of the second beam sweeping if the terminal does not have the information on the reciprocity of reception and transmission beams.

In accordance with another aspect of the present disclosure, the controller 920 may control the UE to request system information. As illustrated in FIG. 4, the controller 920 may be configured to control the transceiver 910 to transmit a request message including a RA preamble to the base station in a RA occasion. At least one of the RA preamble or the RA occasion may indicate a system information message which the terminal needs to request and a downlink transmission beam for transmitting the system information message. The controller 920 may be configured to control the transceiver 910 to receive the system information message transmitted by the base station using the downlink transmission beam. The controller 920 may be further configured to control the transceiver 910 to receive an acknowledgement of the request message. The acknowledgement may be transmitted by the base station using the downlink transmission beam. The controller 920 may be further configured to control the transceiver 910 to receive RACH configuration information from the base station. The RACH configuration information may include at least one of association between a SS block and the RA preamble, or association between a SS block and the RA occasion. The controller 920 may be further configured to control the transceiver 910 to receive one or more SS blocks from the base station, and to select a SS bock among the one or more SS blocks. The downlink transmission beam may be indicated based on an index of the selected SS block.

The controller 920 may refer to a circuitry, an ASIC, or at least one processor.

In an embodiment, the operations of the terminal may be implemented using the memory 930 storing corresponding program codes. Specifically, the terminal may be equipped with the memory 930 to store program codes implementing desired operations. To perform the desired operations, the controller 920 may read and execute the program codes stored in the memory 930 by using a processor or a central processing unit (CPU).

Figure 10:
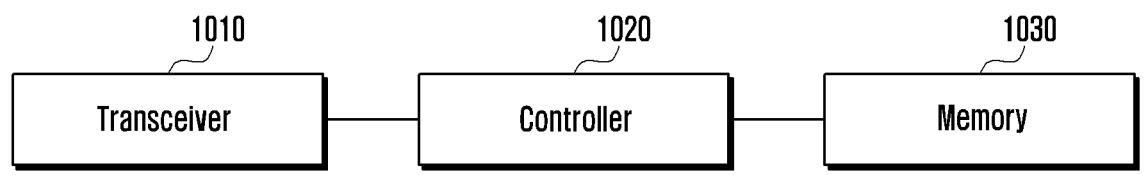
FIG. 10 is a block diagram of a base station according to an embodiment of the disclosure.

FIG. 10 is a block diagram of a base station according to an embodiment of the disclosure.

Referring to FIG. 10, a base station includes a transceiver 1010, a controller 1020 and a memory 1030. The transceiver 1010, the controller 1020 and the memory 1030 are configured to perform the operations of the network (e.g., gNB) illustrated in the figures, e.g., FIGS. 1 to 8, or described above. Although the transceiver 1010, the controller 1020 and the memory 1030 are shown as separate entities, they may be realized as a single entity like a single chip. The transceiver 1010, the controller 1020 and the memory 1030 may be electrically connected to or coupled with each other.

The transceiver 1010 may transmit and receive signals to and from other network entities, e.g., a terminal.

The controller 1020 may control the base station to perform functions according to one of the embodiments described above. As illustrated in FIG. 4, for example, the controller 1020 may be configured to control the transceiver 1010 to receive a request message including a RA preamble from the terminal in a RA occasion. At least one of the RA preamble or the RA occasion may indicate a system information message which the terminal needs to request and a downlink transmission beam for transmitting the system information message. The controller 1020 may be configured to control the transceiver 1010 to transmit the system information message to the terminal using the downlink transmission beam. The controller 1020 may be further configured to control the transceiver 1010 to transmit an acknowledgement of the request message to the terminal using the downlink transmission beam. The controller 1020 may be further configured to control the transceiver 1010 to transmit RACH configuration information to the terminal. The RACH configuration information may include at least one of association between a SS block and the RA preamble, or association between a SS block and the RA occasion. The controller 1020 may be configured to control the transceiver 1010 to transmit one or more SS blocks to the terminal. The downlink transmission beam may be indicated based on an index of a SS block selected among the one or more SS blocks. The controller 1020 may refer to a circuitry, an ASIC, or at least one processor.

In an embodiment, the operations of the base station may be implemented using the memory 1030 storing corresponding program codes. Specifically, the base station may be equipped with the memory 1030 to store program codes implementing desired operations. To perform the desired operations, the controller 1020 may read and execute the program codes stored in the memory 1030 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
 receiving, from a base station, first information on at least one random access (RA) preamble for each system information (SI) request and second information for configuring at least one physical random access channel (PRACH) occasion for the each SI request;
 selecting a synchronization signal (SS) block;
 selecting a RA preamble corresponding to the selected SS block, from the at least one RA preamble for an SI message which the terminal needs to request, based on the first information;
 identifying a PRACH occasion corresponding to the selected SS block, from the at least one PRACH occasion for the SI message which the terminal needs to request, based on the second information;
 transmitting, to the base station, the RA preamble in the PRACH occasion, the RA preamble and the PRACH occasion indicating the SI message which the terminal needs to request; and
 receiving, from the base station, the SI message indicated based on the RA preamble and the PRACH occasion.

2. The method of claim 1, further comprising:
receiving, from the base station, a RA response associated with an acknowledgement for a request of the SI message, wherein the RA response is transmitted by the base station using a downlink transmission beam corresponding to the selected SS block.

3. The method of claim 1, wherein the at least one RA preamble is mapped to each SS block.

4. The method of claim 1, wherein the at least one PRACH occasion is mapped to each SS block.

5. A method performed by a base station in a wireless communication system, the method comprising:
transmitting, to a terminal, first information on at least one random access (RA) preamble for each system information (SI) request and second information for configuring at least one physical random access channel (PRACH) occasion for the each SI request; and
receiving, from the terminal, a RA preamble in a PRACH occasion, the RA preamble and the PRACH occasion indicating an SI message which the terminal needs to request; and
transmitting, to the terminal, the SI message indicated based on the RA preamble and the PRACH occasion.

6. The method of claim 5, further comprising:
identifying a synchronization signal (SS) block based on the RA preamble or the PRACH occasion; and
transmitting, to the terminal, a RA response associated with an acknowledgement for a request of the SI message using a downlink transmission beam corresponding to the identified SS block.

7. The method of claim 5, wherein the at least one RA preamble is mapped to each synchronization signal (SS) block.

8. The method of claim 5, wherein the at least one PRACH occasion is mapped to each synchronization signal (SS) block.

9. A terminal in a wireless communication system, the terminal comprising:
a transceiver; and
a controller coupled with the transceiver and configured to:
receive, from a base station, first information on at least one random access (RA) preamble for each system information (SI) request and second information for configuring at least one physical random access channel (PRACH) occasion for the each SI request,
select a synchronization signal (SS) block,
select a RA preamble corresponding to the selected SS block, from the at least one RA preamble for an SI message which the terminal needs to request based on the first information,
identify a PRACH occasion corresponding to the selected SS block, from the at least one PRACH occasion for the SI message which the terminal needs to request, based on the second information,
transmit, to the base station, the RA preamble in the PRACH occasion, the RA preamble and the PRACH occasion indicating the SI message which the terminal needs to request, and
receive, from the base station, the SI message indicated based on the RA preamble and the PRACH occasion.

10. The terminal of claim 9, wherein the controller is further configured to:
receive, from the base station, a RA response associated with an acknowledgement for a request of the SI message, wherein the RA response is transmitted by the base station using a downlink transmission beam corresponding to the selected SS block.

11. The terminal of claim 9, wherein the at least one RA preamble is mapped to each SS block.

12. The terminal of claim 9, wherein the at least one PRACH occasion is mapped to each SS block.

13. A base station in a wireless communication system, the base station comprising:
a transceiver; and
a controller coupled with the transceiver and configured to:
transmit, to a terminal, first information on at least one random access (RA) preamble for each system information (SI) request and second information for configuring at least one physical random access channel (PRACH) occasion for the each SI request,
receive, from the terminal, a RA preamble in a PRACH occasion, the RA preamble and the PRACH occasion indicating an SI message which the terminal needs to request, and
transmit, to the terminal, the SI message indicated based on the RA preamble and the PRACH occasion.

14. The base station of claim 13, wherein the controller is further configured to:
identify a synchronization signal (SS) block based on the RA preamble or the PRACH occasion, and
transmit, to the terminal, a RA response associated with an acknowledgement for a request of the SI message using a downlink transmission beam corresponding to the identified SS block.

15. The base station of claim 13, wherein the at least one RA preamble is mapped to each synchronization signal (SS) block.

16. The base station of claim 13, wherein the at least one PRACH occasion is mapped to each synchronization signal (SS) block.

* * * * *